US012687858B2

(12) United States Patent   (10) Patent No.:    US 12,687,858 B2
Liu et al.   (45) Date of Patent:    Jul. 21, 2026

(54) AUTONOMOUS MOBILE DEVICE, OPERATING METHOD AND STORAGE MEDIUM FOR CONTROLLING AUTONOMOUS MOBILE DEVICE TO MOVE ALONG A WORK ROUTE

(71) Applicant: Qfeeltech (Beijing) Co., Ltd., Beijing (CN)

(72) Inventors: Zhanglin Liu, Beijing (CN); Wei Zhang, Beijing (CN); Qingyan Liu, Beijing (CN)

(73) Assignee: Qfeeltech (Beijing) Co., Ltd., Beijing (CN)

( * ) Notice: Subject to any disclaimer, the term of this patent is extended or adjusted under 35 U.S.C. 154(b) by 5 days.

(21) Appl. No.: 18/956,373

(22) Filed: Nov. 22, 2024

(65) Prior Publication Data

US 2025/0085719 A1      Mar. 13, 2025

Related U.S. Application Data

(63) Continuation of application No. PCT/CN2023/098583, filed on Jun. 6, 2023.

(30) Foreign Application Priority Data

Jun. 14, 2022    (CN) .......................... 202210685211.8

(51) Int. Cl.
    *G05D 109/10*        (2024.01)
    *A47L 9/28*          (2006.01)
        (Continued)
(52) U.S. Cl.
    CPC ............ *G05D 1/648* (2024.01); *A47L 9/2805* (2013.01); *G05D 1/622* (2024.01); *G05D 2105/10* (2024.01)

(58) Field of Classification Search
    CPC .... G05D 1/648; G05D 1/622; G05D 2105/10; A47L 9/2805
    See application file for complete search history.

(56) References Cited

U.S. PATENT DOCUMENTS 9,226,635 B2     1/2016  Kim et al.
2014/0100736 A1*   4/2014  Kim ...................... B25J 9/0003
                                                    15/49.1
        (Continued)

FOREIGN PATENT DOCUMENTS

CN          105491931 A      4/2016
CN          106970625 A      7/2017
        (Continued)

OTHER PUBLICATIONS

International Search Report and Written Opinion dated Sep. 5, 2023, issued in PCT/CN2023/098583, filed on Jun. 6, 2023, and their English machine translations (12 pages).

*Primary Examiner* — Scott A Browne
*Assistant Examiner* — Rami Nabih Bedewi
(74) *Attorney, Agent, or Firm* — Alleman Hall LLP

(57) ABSTRACT

The present disclosure provides an autonomous mobile device, an operating method, and a storage medium. The operating method is configured to control the autonomous mobile device to move along a work route, including: a first rotating step in which the autonomous mobile device rotates in a first direction for a first angle at a first location on the work route; a first moving step in which the autonomous mobile device moves to a second location on the work route; a second rotating step in which the autonomous mobile device rotates in a second direction for a second angle at the second location; and a second moving step in which the autonomous mobile device continues moving along the work route. The first rotating step, the first moving step, the (Continued)

First location        Third location        Second location

State 2

Work route

State 4

State 3

State 1                                      State 5 second rotating step, and the second moving step form a
cycle, and the operating method includes repeatedly execut-
ing the cycle.

16 Claims, 8 Drawing Sheets

(51) Int. Cl.
G05D 1/622 (2024.01)
G05D 1/648 (2024.01)
G05D 105/10 (2024.01)

(56) References Cited

U.S. PATENT DOCUMENTS

2023/0180986 A1* 6/2023 Shin .................... A47L 11/4011
                                                      134/6
2023/0355065 A1* 11/2023 Finnegan ............. A47L 9/2805

FOREIGN PATENT DOCUMENTS

| CN | 108113583 A | 6/2018 |
|----|-------------|--------|
| CN | 113208511 A | 8/2021 |
| KR | 20050010591 A | 1/2005 |
| WO | 2021215871 A1 | 10/2021 |

* cited by examiner

First location                    Second location

First location                 Second location

State 4

State 3

State 2

State 1

AUTONOMOUS MOBILE DEVICE, OPERATING METHOD AND STORAGE MEDIUM FOR CONTROLLING AUTONOMOUS MOBILE DEVICE TO MOVE ALONG A WORK ROUTE

CROSS REFERENCE TO RELATED APPLICATIONS

This application is a continuation of International Application No. PCT/CN2023/098583, filed on Jun. 6, 2023, which claims priority to Chinese Patent Application No. 202210685211.8, filed on Jun. 14, 2022, in Chinese Patent Office, and titled "AUTONOMOUS MOBILE DEVICE, OPERATING METHOD AND STORAGE MEDIUM." The contents of the above referenced applications are incorporated herein by reference in their entirety.

TECHNICAL FIELD

The present disclosure relates to the technical field of autonomous mobile devices, and more particularly, to an autonomous mobile device, an operating method and a storage medium.

BACKGROUND TECHNOLOGY

In recent years, autonomous mobile devices such as cleaning robots have gained rapid developments. A cleaning robot can autonomously navigate and move around in a work zone, to perform cleaning tasks along predetermined routes. A floor mopping device is a typical type of cleaning robots. A chassis of the floor mopping device is provided with one or more rotating or vibrating mopping plates, which are configured to clean the floor during movements of the floor mopping device. Typically, a cleaning robot continuously moves along a work route. Under this cleaning method, each floor area along the work route is usually only traversed once by the cleaning robot, which makes it difficult to satisfy the cleaning requirements in a very dirty zone, such as a kitchen.

In addition, when the mopping plate works, the mopping plate may apply forces to the floor in different directions during movements of the mopping plate. Because forces are reciprocal, the forces applied onto the floor may cause the floor mopping device to slip or deflect, which may cause deviation errors in the moving direction and moving distance of the floor mopping device. In the meantime, because spraying water onto the floor by the floor mopping device can cause the floor to be slippery, which can worsen the slippage of the floor mopping device, and further increase the deviation errors of the floor mopping device. Accumulation of the above errors can reduce the accuracy of the localization and navigation of the floor mopping device.

SUMMARY OF DISCLOSURE

An objective of the present disclosure is to overcome or at least alleviate the deficiencies of the existing technologies, and to provide an autonomous mobile device, an operating method and a storage medium.

According to a first aspect of the present disclosure, an operating method for an autonomous mobile device is provided. The method is configured to control the autonomous mobile device to move along a work route. The method includes: a first rotating step in which the autonomous mobile device is controlled to rotate in a first direction for a first angle at a first location along the work route; a first moving step in which the autonomous mobile device is controlled to move to a second location along the work route; a second rotating step in which the autonomous mobile device is controlled to rotate in a second direction for a second angle at the second location; and a second moving step in which the autonomous mobile device is controlled to continue moving along the work route; wherein the first rotating step, the first moving step, the second rotating step, and the second moving step are configured to form a cycle, and the method includes repeatedly executing the cycle.

In some embodiments, the first direction and the second direction are opposite to each other, and during a time period from a time instance before the first rotating step to a time instance after the second rotating step, a total rotating angle of the autonomous mobile device in the first direction is equal to a total rotating angle of the autonomous mobile device in the second direction.

In some embodiments, the work route includes at least one of the following route forming units: a straight line moving route, a curved line moving route, or a turning route followed in response to a sensor detecting an obstacle.

In some embodiments, the autonomous mobile device moves along a straight line for a first distance in the first moving step, and moves along a straight line for a second distance in the second moving step.

In some embodiments, each of the first angle and the second angle is equal to a positive integer number times of 360 degrees.

In some embodiments, each of the first angle and the second angle is equal to an odd number times of 180 degrees.

In some embodiments, each of the first distance and the second distance is smaller than or equal to a work width of the autonomous mobile device.

In some embodiments, a moving distance in the first moving step is zero, and the second rotating step includes: controlling the autonomous mobile device to rotate in the second direction for a third angle, and controlling the autonomous mobile device to rotate in the first direction for a fourth angle, wherein, the third angle is greater than the fourth angle, and the second angle is equal to a difference between the third angle and the fourth angle.

In some embodiments, the first moving step also includes: a third moving step in which the autonomous mobile device is controlled to move along a straight line for a third distance to a third location; a third rotating step in which the autonomous mobile device is controlled to rotate in the first direction for a third angle at the third location; a fourth moving step in which the autonomous mobile device is controlled to move along a straight line for a fourth distance to a fourth location, wherein, the third location and the fourth location are located at two sides of the work route, and projections of the third location and the fourth location on the work route are located between the first location and the second location; a fourth rotating step in which the autonomous mobile device is controlled to rotate in the second direction for a fourth angle at the fourth location; and a fifth moving step in which the autonomous mobile device is controlled to move along a straight line for a fifth distance to the second location, wherein a sum of the first angle and the third angle is equal to a sum of the second angle and the fourth angle.

In some embodiments, a moving distance of the autonomous mobile device in the second moving step is zero.

In some embodiments, each of the third distance, the fourth distance, and the fifth distance is smaller than or equal to a work width of the autonomous mobile device.

In some embodiments, the first moving step also includes: a third moving step in which the autonomous mobile device is controlled to move for a third distance to the third location; and a fourth moving step in which the autonomous mobile device is controlled to move for a fourth distance to the second location, wherein, each of the first location, the second location, and the third location is located on the work route, and the third location is located between the first location and the second location. The autonomous mobile device rotates in the first direction for a third angle during a time period in which the autonomous mobile device moves for the third distance, such that the autonomous mobile device moves along an arc line for the third distance. The autonomous mobile device rotates in the second direction for a fourth angle during a time period in which the autonomous mobile device moves for the fourth distance, such that the autonomous mobile device moves along an arc line for the fourth distance. A sum of the first angle and the third angle is equal to a sum of the second angle and the fourth angle.

In some embodiments, a moving distance of the autonomous mobile device in the second moving step is zero.

In some embodiments, each of the third distance and the fourth distance is smaller than or equal to a work width of the autonomous mobile device.

According to a second aspect of the present disclosure, an autonomous mobile device is provided, including: a driving module, configured to move the autonomous mobile device; and a control module, configured to control the driving module to move the autonomous mobile device along a work route, wherein when the control module is configured to control the driving module to move the autonomous mobile device along the work route, the control module is configured to perform: a first rotating step in which the autonomous mobile device is controlled by the control module to rotate in a first direction for a first angle at a first location on the work route; a first moving step in which the autonomous mobile device is controlled by the control module to move to a second location on the work route; a second rotating step in which the autonomous mobile device is controlled by the control module to rotate in a second direction for a second angle at the second location; and a second moving step in which the autonomous mobile device is controlled by the control module to continue moving along the work route, wherein, the first rotating step, the first moving step, the second rotating step, and the second moving step are configured to form a cycle, and the control module is configured to control the driving module to repeatedly execute the cycle.

In some embodiments, the first direction and the second direction are opposite to each other, and during a time period from a time instance before the first rotating step to a time instance after the second rotating step, a total rotating angle of the autonomous mobile device in the first direction equals to a total rotating angle of the autonomous mobile device in the second direction.

In some embodiments, the work route includes at least one of the following route forming units: a straight line moving route, a curved line moving route, or a turning route followed in response to a sensor detecting an obstacle.

In some embodiments, the autonomous mobile device moves for a first distance along a straight line in the first moving step, and moves along a straight line for a second distance in the second moving step.

In some embodiments, each of the first angle and the second angle is equal to a positive integer number times of 360 degrees.

In some embodiments, each of the first angle and the second angle is equal to an odd number times of 180 degrees.

In some embodiments, each of the first distance and the second distance is smaller than or equal to a work width of the autonomous mobile device.

In some embodiments, a moving distance in the first moving step is zero, and the second rotating step includes: controlling the autonomous mobile device to rotate in the second direction for a third angle, and controlling the autonomous mobile device to rotate in the first direction for a fourth angle, wherein, the third angle is greater than the fourth angle, and the second angle is equal to a difference between the third angle and the fourth angle.

In some embodiments, the first moving step also includes: a third moving step in which the autonomous mobile device is controlled to move along a straight line for a third distance to a third location; a third rotating step in which the autonomous mobile device is controlled to rotate in the first direction for a third angle at the third location; a fourth moving step in which the autonomous mobile device is controlled to move along a straight line for a fourth distance to a fourth location, wherein, the third location and the fourth location are at two sides of the work route, and projections of the third location and the fourth location on the work route are located between the first location and the second location; a fourth rotating step in which the autonomous mobile device is controlled to rotate in the second direction for a fourth angle at the fourth location; and a fifth moving step in which the autonomous mobile device is controlled to move along a straight line for a fifth distance to the second location, wherein a sum of the first angle and the third angle is equal to a sum of the second angle and the fourth angle.

In some embodiments, a moving distance of the autonomous mobile device in the second moving step is zero.

In some embodiments, each of the third distance, the fourth distance, and the fifth distance is smaller than or equal to a work width of the autonomous mobile device.

In some embodiments, the first moving step also includes: a third moving step in which the autonomous mobile device is controlled to move for a third distance to the third location; and a fourth moving step in which the autonomous mobile device is controlled to move for a fourth distance to the second location, wherein, each of the first location, the second location, and the third location is located on the work route, and the third location is located between the first location and the second location. The autonomous mobile device rotates in the first direction for a third angle during a time period in which the autonomous mobile device moves for the third distance, such that the autonomous mobile device moves along an arc line for the third distance. The autonomous mobile device rotates in the second direction for a fourth angle during a time period in which the autonomous mobile device moves for the fourth distance, such that the autonomous mobile device moves along an arc line for the fourth distance. A sum of the first angle and the third angle is equal to a sum of the second angle and the fourth angle.

In some embodiments, a moving distance of the autonomous mobile device in the second moving step is zero.

In some embodiments, each of the third distance and the fourth distance is smaller than or equal to a work width of the autonomous mobile device.

According to a third aspect of the present disclosure, an autonomous mobile device is provided, including: a motion unit, configured to move the autonomous mobile device; one or more processors; and a storage device, configured to store computer-executable instructions, wherein, when the instructions are executed by the one or more processors, the instructions cause the one or more processors to execute the operating methods for the autonomous mobile device described in the present disclosure.

According to a fourth aspect of the present disclosure, a non-transitory computer-readable storage medium is provided, which is configured to store computer-executable instructions, wherein, when the instructions are executed by one or more processors, the instructions cause the one or more processors to execute the operating methods for the autonomous mobile device described in the present disclosure.

According to a fifth aspect of the present disclosure, a computer program product is provided, which includes computer-executable instructions. When the instructions are executed by a computer, the instructions cause the computer to execute the operating methods for the autonomous mobile device described in the present disclosure.

According to the technical solutions of the present disclosure, coverage of the work zone for a longer time may be achieved through rotating the autonomous mobile device, thereby increasing the cleaning effectiveness. In the meantime, deviation errors generated in the work process of the autonomous mobile device, such as a floor mopping device, can be eliminated, thereby increasing the accuracy of localization and navigation.

Based on the following detailed descriptions of the illustrative embodiments with reference to the accompanying drawings, other features and aspects of the present disclosure will become clear.

BRIEF DESCRIPTIONS OF DRAWINGS

DETAILED DESCRIPTIONS

Next, various illustrative embodiments, features, and aspects of the present disclosure will be explained in detail with reference to the accompanying drawings. The same labels in the accompanying drawings represent components having the same or similar functions. Although various aspects are illustrated in the accompanying drawings, unless otherwise noted, the drawings are not necessarily to scale.

The specific term "illustrative" as used herein means "as an example, an embodiment, or illustration." Any embodiment modified by the term "illustrative" need not be interpreted as being advantageous or better than other embodiments.

In addition, to better explain the present disclosure, various specific details are provided in the following detailed implementations. A person having ordinary skills in the art can appreciate that without certain specific details, the present disclosure can still be implemented. In some embodiments, methods, means, components and electric circuits that may be well-known to a person having ordinary skills in the art are not explained in detail, such that the main principle of the present disclosure can be conveniently explained.

For example, in the following illustrative embodiments, a floor mopping device is used as an example to explain the main principle of the present disclosure. However, a person having ordinary skills in the art can appreciate that the technical solutions of the present disclosure can also be implemented in other autonomous mobile devices that need localization and navigation, such as a floor sweeping device.

Figure 1:
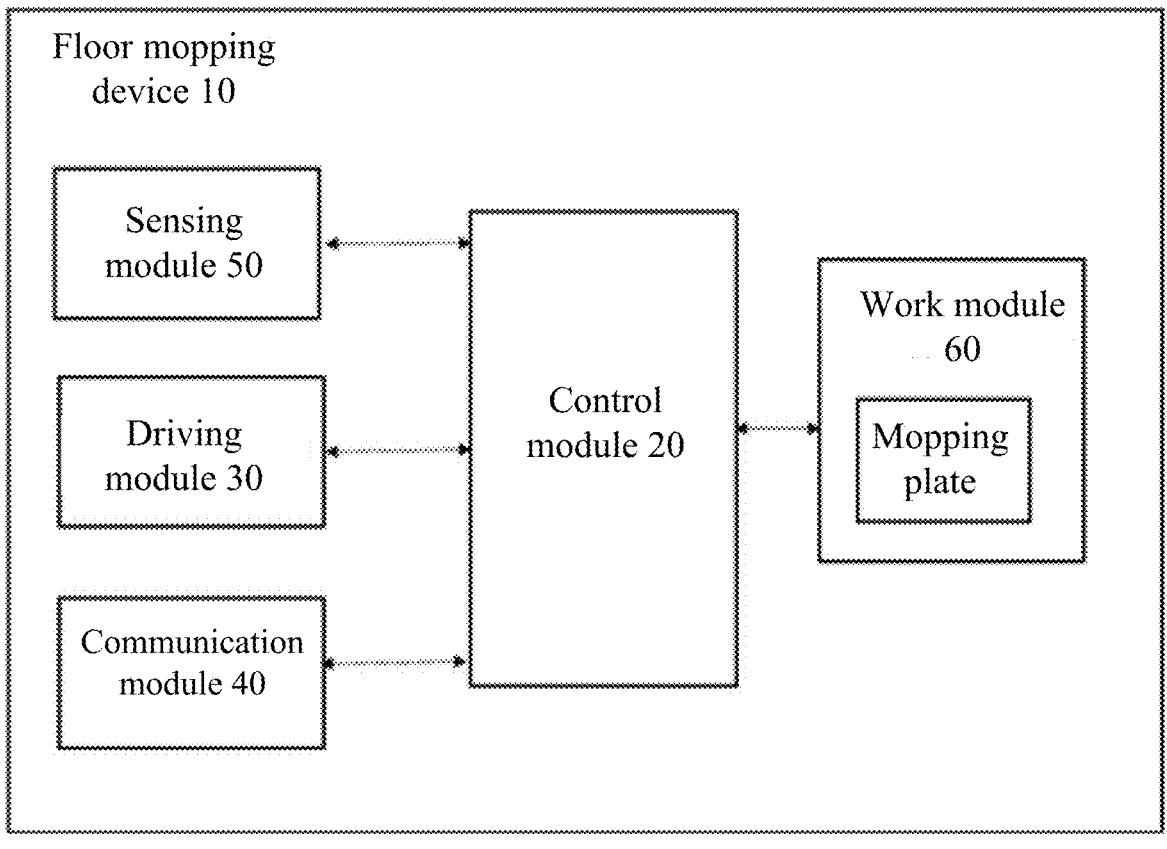
FIG. 1 shows a structure of a floor mopping device according to an illustrative embodiment.

FIG. 1 shows a structure of a floor mopping device according to an illustrative embodiment. The autonomous mobile device, i.e., a floor mopping device 10, may include a control module 20 and a driving module 30. The term "module" as used herein includes both hardware and software components, such as one or more of circuits, logic gates, processors, storage devices, program codes or instructions, etc. The term "module" may also be referred to as "unit," "apparatus," or "device." The control module 20 may include at least a processor. In some embodiments, the control module 20 may also include a storage device and other electronic circuits or components. The control module 20 may control the movement of the floor mopping device 10 through controlling the driving module 30. The floor mopping device 10 may also include a communication module 40 configured to provide communication between the floor mopping device 10 and other devices such as a mobile terminal, a base station, and/or a server. The floor mopping device 10 may further include a sensing module 50. The sensing module 50 may include an Inertial Measurement Unit (IMU), an odometer, a laser distance measuring device, and/or a camera, etc. The control module 20 may obtain various motion parameter data (e.g., distance, linear velocity, angular velocity, acceleration, etc.) and environmental parameter data from the sensing module 50, and may calculate the locations of the floor mopping device 10 and various obstacles in the environment through corresponding algorithms, through which the floor mopping device 10 may create a map and perform localization and navigation. The floor mopping device 10 may also include a work module 60. The work module 60 may include a mopping plate or other cleaning units or components configured to clean a work surface (e.g., a floor). The control module 20 may control the work module 60 to perform cleaning of a work surface. For example, the mopping plate may be one or more rotating plates, to which one or more mops may be attached for cleaning the work surface. Alternatively, the mopping plate may be a plate that reciprocally vibrates in one or more directions, to which a mop may be attached for cleaning the work surface. The floor mopping device 10 may also include other modules that may be typically included in a cleaning robot, such as a water tank, a display module, a charging module, an alarm module, etc., which are not limited in the present disclosure.

Figure 2:
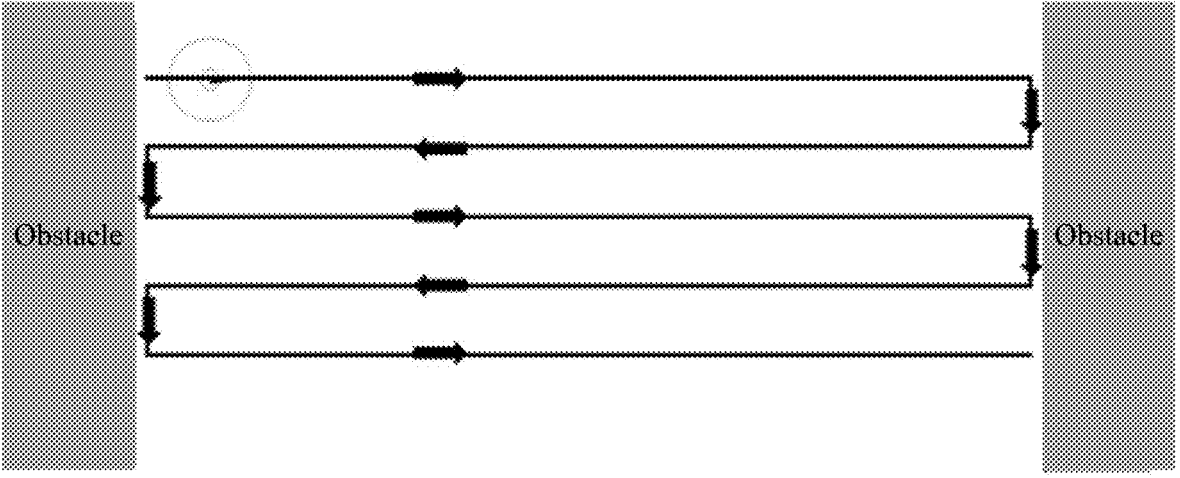
FIG. 2 is a schematic illustration of a work route of the floor mopping device according to an illustrative embodiment.

While the control module 20 controls the work module 60 to perform a cleaning task, the control module 20 may also control the driving module 30 such that the floor mopping device 10 moves along a predetermined work route, thereby realizing cleaning of the entire work surface of the work zone. As shown in FIG. 2, the work route may be a cornrow floor covering route. For example, the floor mopping device 10 may move along a straight, first long edge direction, and when it encounters an obstacle, the floor mopping device 10 may turn clockwise such that a side of the floor mopping device 10 may be approximately parallel with an edge of the obstacle. Then the floor mopping device 10 may move along the edge of the obstacle for a predetermined short distance (which may be about a work width, such as 25 cm), and then rotate at the same location to a second long edge direction that is anti-parallel with the first long edge direction (this process may also be referred to as reversing-direction). The floor mopping device 10 may then move forward along the second long edge direction. When the floor mopping device 10 again encounters an obstacle, after the floor mopping device 10 turns counter-clockwise such that a side of the floor mopping device 10 is approximately parallel with an edge of the obstacle, and after the floor mopping device 10 moves along the edge of the obstacle for the predetermined short distance, the floor mopping device 10 may rotate at the same location to the first long edge direction (another reversing-direction), and continue to move forward along the current first long edge direction. These processes may be cyclically and reciprocally executed, to realize the cornrow work route. In other embodiments, the work route may be an edge-following route, i.e., the floor mopping device 10 may move along an edge of the obstacle while maintaining a side of the floor mopping device 10 to be approximately parallel with the edge of the obstacle. For example, the edge-following route may be a route in which the floor mopping device 10 moves in a room along an edge of a wall of the room and an edge of a furniture that may be located close to the edge of the wall. In other embodiments, the work route may be an obstacle avoidance route. That is, the floor mopping device 10 may move toward a target point or a target zone along a curve while avoiding obstacles in the work zone (e.g., a dinner table and chairs located beside the dinner table in the room). For example, when the floor mopping device 10 encounters an obstacle, the floor mopping device 10 may start moving backwardly to move away from the obstacle, and may then move on a floor section that has no obstacle to arrive at a target location. In other embodiments, the work route may be a navigation route. That is, the floor mopping device 10 may determine, based on a target location included in instructions and based on a map, and using a suitable algorithm, a route that is away from the surrounding obstacles at sufficient distances, and may move along the determined route until it arrives at the target location. In some embodiments, the work route may also be another planned route typically adopted by a cleaning robot, which is not limited by the present disclosure. From the description of the work route, it can be understood that the work route may be decomposed into route forming units that are smaller than the specific work route, such as a straight line moving route (e.g., moving along the first long edge direction or along the second long edge direction in the above-described cornrow floor covering route), a curved line moving route (e.g., moving along a curved line or a bent line toward a target point or a target zone in the above-described obstacle avoidance route), a turning route followed in response to a sensor detecting an obstacle (e.g., the reversing-direction in the above-described cornrow floor covering route, or the starting moving backwardly to move away from the obstacle in the obstacle avoidance route), which are all typical and commonly used route forming units.

During the process of the floor mopping device moving along the work route, the floor mopping device can perform other specific steps described in the embodiments of the present disclosure, to realize the technical effect of the present disclosure.

Figure 3:
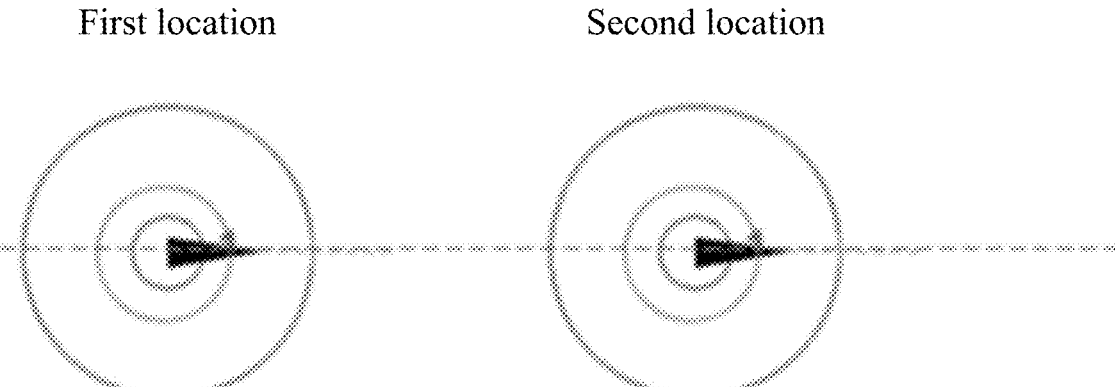
FIG. 3 is a schematic illustration of an operating method for the floor mopping device according to an illustrative embodiment.

First embodiment: FIG. 3 is a schematic illustration of a work operating method for the floor mopping device according to an illustrative embodiment. In the first embodiment, the floor mopping device may perform a first rotating step at a first location on the work route, i.e., rotating in a first direction for a first angle. For example, the first direction may be a clockwise direction, and the first angle may be 360 degrees. After the first rotating step, the floor mopping device may perform a first moving step, e.g., moving along a straight line for a first distance to a second location. After the first moving step, the floor mopping device may complete a second rotating step at the second location, i.e., rotating in a second direction for a second angle. For example, the second direction may be a clockwise direction, and the second angle may be 360 degrees. After the second rotating step, the floor mopping device may perform a second moving step, i.e., moving along the work route. For example, the floor mopping device may move along a straight line for a second distance. The second distance may be the same as or different from the first distance.

When moving in the first moving step and in the second moving step, the floor mopping device moves along the work route, and the first location and the second location are both on the work route. Therefore, after the floor mopping device completes the first rotating step, the first moving step, the second rotating step, and the second moving step, the floor mopping device completes moving along a portion of the work route.

For example, the first rotating step, the first moving step, the second rotating step, and the second moving step may all be performed in a straight-line section of the work route. In such an embodiment, the first location and the second location may be on a same straight line, and the first distance and the second distance are also on this straight line. Alternatively, the first rotating step, the first moving step, the second rotating step, and the second moving step may be performed along a non-straight-line section of the work route, such as the reversing-direction portion of the cornrow work route when an obstacle is encountered. In such an embodiment, during a time period in which the floor mopping device moves for the first distance or the second distance, the floor mopping device may complete the reversing-direction once, and the first location and the second location may be respectively located on two long edges before and after the reversing-direction, or may be respectively located on a long edge and a short edge before and after the reversing-direction. The non-straight-line section of the work route may be a curved line or a bent line for avoiding an obstacle. For example, during a time period in which the floor mopping device moves for the first distance or the second distance, the floor mopping device may move along a curved line or a bent line to avoid an obstacle.

After the floor mopping device completes the second moving step, the floor mopping device may sequentially repeat the cycle formed by the above steps to continue completing the subsequent portions of the work route. For example, the floor mopping device may complete a cycle after moving for the second distance, and may again execute steps of a previous cycle, i.e., sequentially repeat the first rotating step, the first moving step, the second rotating step, and the second moving step of the previous cycle. The floor mopping device may repeatedly and cyclically perform these steps to complete the floor mopping task along the work route. The present disclosure does not limit the specific the time and location for the floor mopping device to complete the above repeats.

Because the floor mopping device performs rotations on the work route, the floor mopping device can provide deeper cleaning on the work surface, to realize better cleaning effect.

Second embodiment: due to reasons such as the relative motion between the mopping plate and the floor and the slippery floor, a deviation error may exist after the floor mopping device completes the first rotating step and the first moving step. For example, due to the deviation error, the actual angle the floor mopping device rotates for in the first rotating step may be smaller than or greater than 360 degrees, and the floor mopping device may deviate from a planned navigation route in the first moving step.

Figure 4:
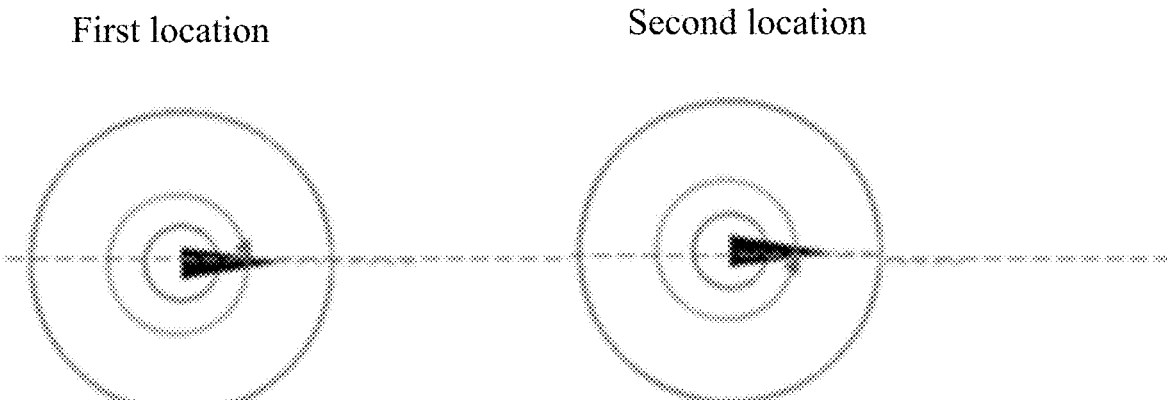
FIG. 4 is a schematic illustration of an operating method for the floor mopping device according to another illustrative embodiment.

FIG. 4 is a schematic illustration of an operating method for the floor mopping device according to another illustrative embodiment. In order to eliminate the deviation error, in the second embodiment, the floor mopping device may rotate in the second direction (e.g., counter clockwise direction) for the second angle in the second rotating step, where the second direction is opposite to the first direction (e.g., clockwise direction) in which the floor mopping device rotates in the first rotating step, and the second angle is equal to the first angle the floor mopping device rotates for in the first rotating step (e.g., 360 degrees or any positive integer number times of 360 degrees), and then the floor mopping device may perform the second moving step. As such, on a portion of the work route, the floor mopping device completes two or more times of 360-degree rotations in opposite directions, and a total rotating angle in the clockwise direction is equal to a total rotating angle in the counter clockwise direction, which results in correction of the deviation error of the localization of the floor mopping device. For example, the floor mopping device may be controlled to rotate clockwise for 360 degrees when performing the first rotating step, but in this process, the actual rotating angle may have a deviation error such as 1%, for example, the actual rotating angle may be smaller than the 360 degrees by 1%. Then in the first moving step, the floor mopping device may move for the first distance while slightly deviating to the left side. Then when the floor mopping device performs the second rotating step, the floor mopping device may rotate counter clockwise for 360 degrees with the same 1% deviation error (i.e., the actual rotating angle is smaller than 360 degrees by 1%). The floor mopping device may correct the deviation error occurred in the previous first rotating step, and may move in the correct direction for the second distance in the second moving step. Thus, in this section of the work route, the deviation errors in two opposite directions can be eliminated in the process of completing one round of cyclical movement. Therefore, deeper cleaning of the work surface may be realized through rotations, and in the meantime, the accuracy of the moving route of the floor mopping device is increased.

Figure 5:
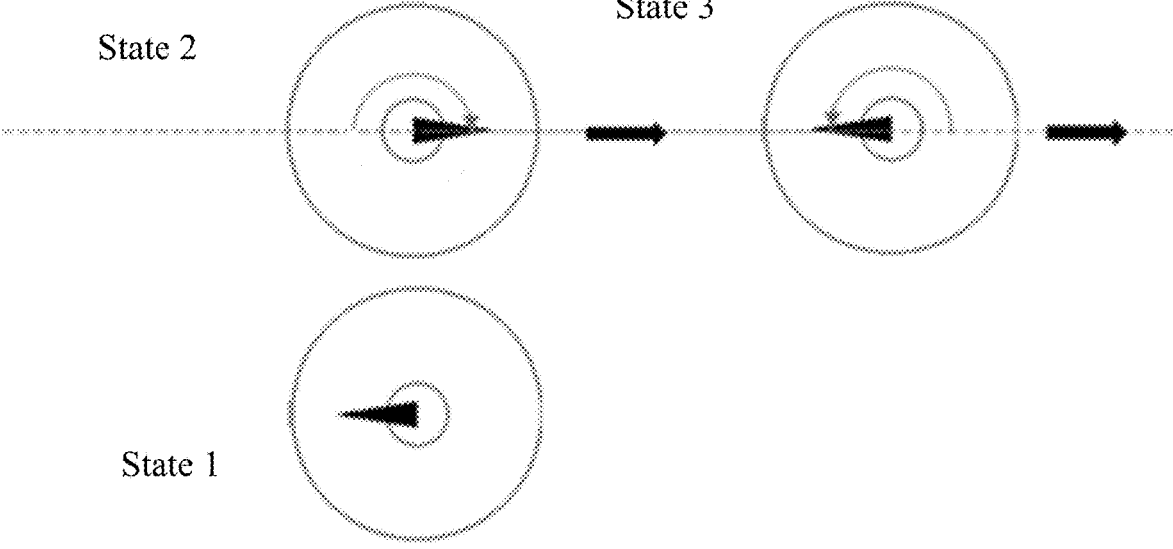
FIG. 5 is a schematic illustration of an operating method for the floor mopping device according to another illustrative embodiment.

Third embodiment: FIG. 5 is a schematic illustration of a work operating method for the floor mopping device according to another illustrative embodiment. In the third embodiment, the floor mopping device may rotate at a first location on the work route in a first direction such as a clockwise direction for an odd number times of 180 degrees. For example, if the floor mopping device uses a charging contact plate located at its front lower portion to contact a charging plate on a charging station to perform charging, then before leaving the charging station, the front portion of the floor mopping device faces the charging station (state 1). After being started, the floor mopping device may use its starting location, which is the location when it is still on the charging station or its location when it moves slightly backwardly away from the charging plate of the charging station, as the first location to perform the first rotating step for the first time, such as rotating in the clockwise direction for 180 degrees to state 2. At this moment, the head portion of the floor mopping device faces a side that is away from the charging station, and the floor mopping device may move "forward" for the first distance to realize movement along the work route.

Next, at the second location, the floor mopping device may rotate in the counter clockwise direction for 180 degrees to state 3, and then move in an opposite direction (i.e., move backwardly relative to the facing direction of the floor mopping device) for the second distance, thereby completing a first cycle. Then, the floor mopping device may start repeating the next cycle, i.e., continue to move along the work route according to the first rotating step, the first moving step, the second rotating step, and the second moving step. In this embodiment, although the second distance for which the floor mopping device moved in the second moving step is a backward moving distance relative to the facing direction of the floor mopping device, because in the second rotating step before the second moving step, the floor mopping device has already turned such that its rear portion faces the front or forward direction of the work route, the second distance is still a forward moving distance relative to the work route. As such, the floor mopping device may repeat the cycle that includes the above first rotating step, the first moving step, the second rotating step, and the second moving step to complete the cleaning tasks along the work route.

A person having ordinary skills in the art can appreciate that when the floor mopping device is started, its front portion may face the forward direction of the work route, and the floor mopping device may rotate at the first location in the first direction, such as a clockwise direction, for an odd number times of 180 degrees (the first rotating step), such that its rear portion faces the forward direction of the work route, and then may move backwardly for the first distance (the first moving step) to arrive at the second location. Then the floor mopping device may rotate at the second location in the second direction, such as the counter clockwise direction, for an odd number times of 180 degrees (the second rotating step; the odd number in this rotation is typically the same as the odd number in the first rotating step). At this moment, the front portion of the floor mopping device faces the forward direction of the work route. Then the floor mopping device may move along the work route for the second distance (the second moving step).

In the above embodiment, the floor mopping device realizes deeper cleaning of the work surface through rotations. Because the rotations at the first location and the second location are for the same degrees and in opposite directions, the deviation errors may be eliminated.

In other embodiments that are based on the first to the third embodiments, the first distance may or may not be equal to the second distance. The first distance and the second distance may both be smaller than or equal to the work width of the autonomous mobile device. For example, the work width may be a total width of the mopping plate. If the floor mopping device includes only a single mopping plate, the work width may be the width of the mopping plate. If the floor mopping plate includes two mopping plates arranged side by side laterally, the work width may be the maximum width of the two mopping plates in the lateral direction. The lateral direction as used here refers to a direction perpendicular to a moving direction of the floor mopping device when the floor mopping device is moving normally. In such an embodiment, each location on the work route may be covered by the rotations of the floor mopping device, thereby realizing better cleaning effect.

Fourth embodiment: in the fourth embodiment, the moving distance of the floor mopping device in the first moving step is zero. In other words, the floor mopping device continuously executes, at the same location that is the first location, the first rotating step and the second rotating step, and may not carry out an effective first moving step. For example, the floor mopping device may first rotate in the first direction, such as the clockwise direction, for the first angle (e.g., 360 degrees) (the first rotating step), and then rotate in an opposite second direction, such as the counter clockwise direction, for the second angle that is the equal to the first angle (the second rotating step). At the same location, the floor mopping device performs two rotations for the same degrees in opposite directions. Therefore, not only the cleaning effect of the floor at the first location is enhanced, the deviation errors can also be eliminated. Furthermore, after executing the second rotating step, the facing direction of the floor mopping device is the same as the facing direction of the floor mopping device before performing the first rotating step, and then the floor mopping device can execute the second moving step, to move along the work route for the second distance, in order to complete a portion of the work route.

Figure 6:
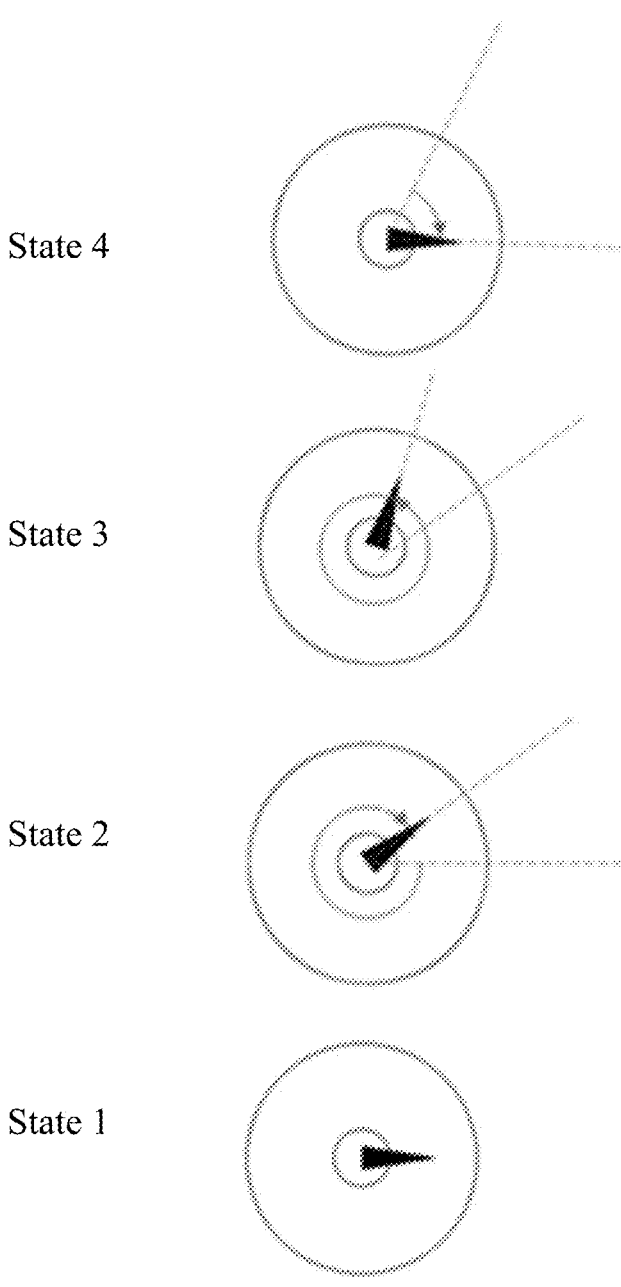
FIG. 6 is a schematic illustration of an operating method for the floor mopping device according to another illustrative embodiment.

FIG. 6 is a schematic illustration of an operating method for the floor mopping device according to another illustrative embodiment. In another embodiment that is based on the fourth embodiment, the first distance in the first moving step is still zero, the floor mopping device may complete the first rotating step at the same location that is the first location. That is, after the floor mopping device rotates in the first direction for the first angle, the second rotating step may be executed. The second rotating step may include: the floor mopping device rotates in the second direction, which is opposite to the first direction, for the third angle, and then rotates in the first direction for the fourth angle. Here, the third angle may be greater than the fourth angle. Under such a circumstance, the floor mopping device may first rotate in the second direction for the third angle and then rotate in the first direction for the fourth angle. Overall, it is equivalent to the floor mopping device rotating in the second direction for the second angle. At this moment, the second angle is equal to a difference between the third angle and the fourth angle (e.g., the third angle minus the fourth angle), and the second angle is still equal to the first angle.

As shown in FIG. 6, in the above embodiment, the floor mopping device may start from state 1. In the first rotating step, the floor mopping device may rotate clockwise (i.e., the first direction in this embodiment) for the first angle that is 350 degrees to state 2. Then in the second rotating step, the floor mopping device may first rotate counter clockwise (i.e., the second direction in this embodiment) for the third angle that is 370 degrees to state 3. Finally, the floor mopping device may rotate clockwise for the fourth angle that is 20 degrees to state 4. Subtracting the fourth angle from the third angle, it is equivalent to the floor mopping device rotating counter clockwise for 350 degrees in the second rotating step. As such, at this same location, a total rotating angle of the floor mopping device in the first direction is still equal to a total rotating angle of the floor mopping device in the second direction, and the first and second directions are opposite to each other. Therefore, not only the cleaning effect on the floor at the first location is enhanced, in the meantime, the deviation errors can be eliminated.

Fifth embodiment: in the fifth embodiment, the angle for which the floor mopping device rotates in the first rotating step is not an integer number times of 180 degrees or 360 degrees. It can be understood that after the first rotating step, the facing direction of the floor mopping device may deviate from the work route. Therefore, in order to enable the floor mopping device to still move forward along the work route after completing one cycle, the first moving step may also include: a third moving step, in which the floor mopping device is controlled to move for a third distance along a straight line to a third location; a third rotating step, in which the floor mopping device is controlled to rotate, at the third location, in the first direction for a third angle; a fourth moving step, in which the floor mopping device is controlled to move along a straight line for a fourth distance to a fourth location, where, the third location and the fourth location are located at two sides of the work route, and projections of the third location and the fourth location on the work route are located between the first location and the second location; a fourth rotating step, in which the floor mopping device is controlled to rotate, at a fourth location, in the second direction for a fourth angle; and a fifth moving step, in which the floor mopping device is controlled to move along a straight line for a fifth distance to the second location. At this moment, the floor mopping device returns to the second location on the work route, but the facing direction of the floor mopping device may possibly form an angle with the work route. Then the floor mopping device may perform, at the second location, the second rotating step. In this embodiment, a sum of the first angle and the third angle is equal to a sum of the second angle and the fourth angle.

Figure 7:
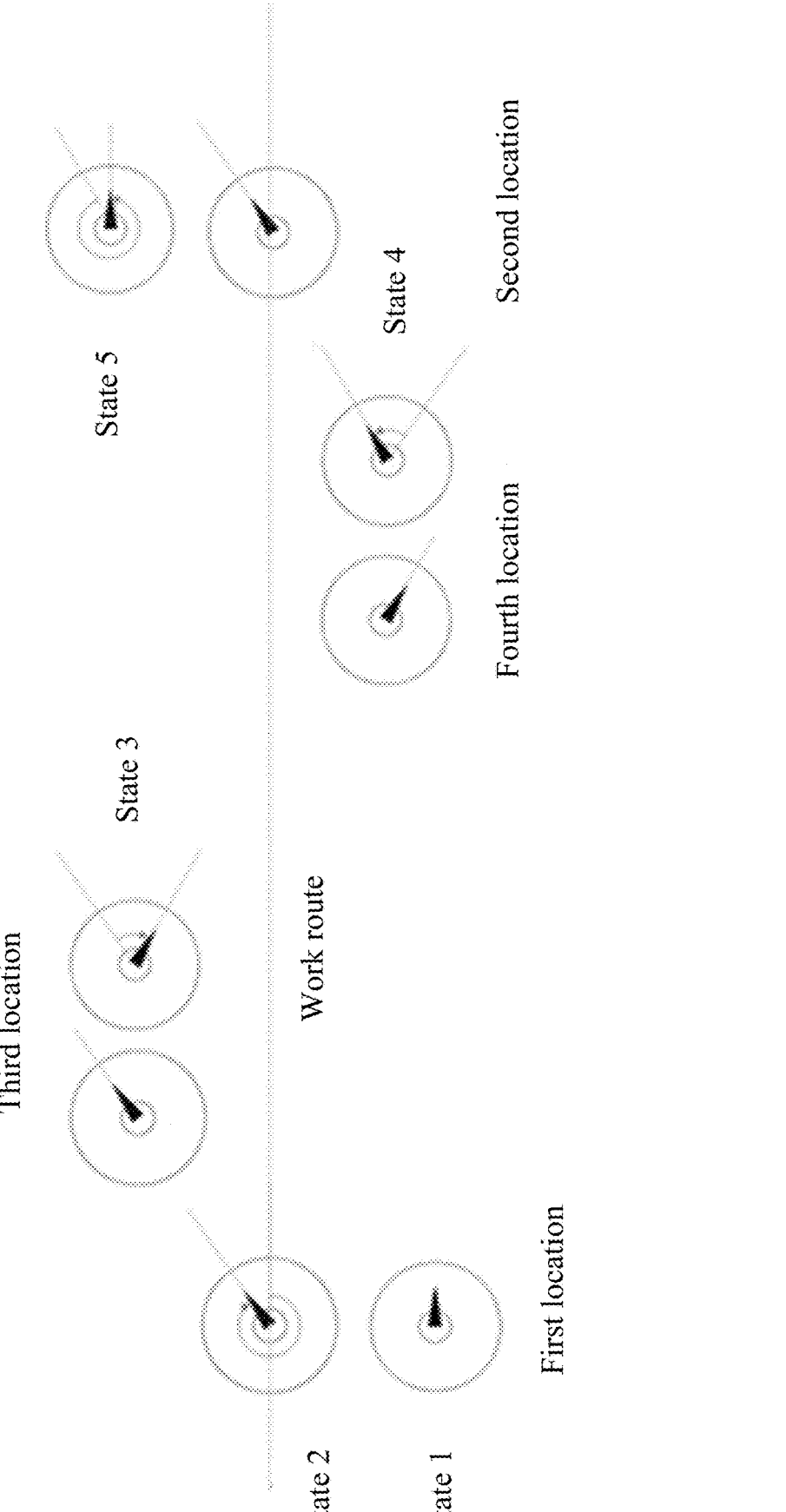
FIG. 7 is a schematic illustration of an operating method for the floor mopping device according to another illustrative embodiment.

FIG. 7 is a schematic illustration of an operating method for the floor mopping device according to another illustrative embodiment. As shown in FIG. 7, in the fifth embodiment, the floor mopping device may start at state 1, and may perform the first rotating step at the first location, i.e., rotating clockwise for the first angle, i.e., 350 degrees, to state 2. Then, the first moving step in which the floor mopping device moves from the first location to the second location may be specifically realized as follows. First, the floor mopping device may move along a straight line for the third distance to the third location. At this moment, the floor mopping device may have deviated from the work route, and the projection of the floor mopping device onto the work route may be located between the first location and the second location. Then the floor mopping device may perform, at the third location, the third rotating step, i.e., the floor mopping device may rotate clockwise at the third location for 25 degrees to state 3. At this moment, an extension line of the facing direction of the floor mopping device may intercept the work route. In the fourth moving step, the floor mopping device may move along a straight line for the fourth distance to a fourth location at another side of the work route. The projection of the fourth location may also be located between the first location and the second location on the work route. The floor mopping device may perform the fourth rotating step at the fourth location, i.e., the floor mopping device may rotate counter clockwise at the fourth location for 30 degrees to state 4. At this moment, the extension line of the facing direction of the floor mopping device may intercept with the work route. Then, in a fifth moving step, the floor mopping device may move along a straight line for a fifth distance to the second location on the work route. Thus, the floor mopping device moves from the first location to the second location, i.e., completes the first moving step. It should be noted that at this moment, although the floor mopping device is at the second location, the facing direction of the floor mopping device may still form an angle with the work route.

Next, the floor mopping device may perform the second rotating step at the second location, i.e., rotating counter clockwise for the second angle to state 5. Here, a sum of the first angle and the third angle is equal to a sum of the second angle and the fourth angle. Therefore, the second angle may be 345 degrees.

As such, during a time period from the start of the first rotating step to the completion of the second rotating step, the total rotating angle of the floor mopping device in the first direction may be equal to the total rotating angle of the floor mopping device in the second direction, and the rotating directions are opposite to each other. Therefore, the accumulated errors may be eliminated. At this moment, the floor mopping device may return to the work route, and the facing direction of the floor mopping device may become the same as the facing direction of the floor mopping device before the first rotating step, which makes it convenient for the floor mopping device to perform the second moving step along the work route.

After the second moving step, the floor mopping device may repeat the first rotating step, the first moving step, the second rotating step, and the second moving step.

In other embodiments based on the fifth embodiment, the moving distance in the second moving step may be zero. In other words, after the floor mopping device completes the second rotating step at the second location, the floor mopping device may perform the first rotating step of the next cycle, and may not carry out an effective second moving step.

In the fifth embodiment, between the first location and the second location, there are two middle locations, i.e., the third location and the fourth location, and three bent lines. A person having ordinary skills in the art can appreciate that more middle locations and bent lines may be set between the first location and the second location, as long as during a time period from the start of the first rotating step to the completion of the second rotating step, a total rotating angle of the floor mopping device in the first direction and a total rotating angle in the second direction are the same and the rotating directions are opposite to each other. The present disclosure does not describe such embodiments in specific details.

In the above fifth embodiment, each of the third distance, the fourth distance, and the fifth distance is smaller than or equal to the work width of the autonomous mobile device. For example, the work width may be a width of the mopping plate. In such embodiments, each location on the work route may be covered by the rotations of the floor mopping device, thereby realizing better cleaning effect.

In the above fifth embodiment, the third angle and the fourth angle for which the floor mopping device rotated may be different, and the third distance and the fifth distance may also be different. That is, a bent line formed by the third distance, the fourth distance, and the fifth distance may not be symmetric relative to the work route. The present dis-closure does not provide specific descriptions. A person having ordinary skills in the art can appreciate that the specific shape of the bent line does not affect the implementation of the technical solutions of the present disclosure and the corresponding technical effect.

Sixth embodiment: in the sixth embodiment, the angle for which the floor mopping device rotated in the first rotating step is not an integer number times of 180 degrees or 360 degrees. It should be understood that after the first rotating step, the facing direction of the floor mopping device may deviate from the work route. Therefore, the first moving step may further include: a third moving step, in which the floor mopping device is controlled to move for a third distance to a third location, and a fourth moving step, in which the floor mopping device is controlled to move for a fourth distance to a second location. Here, each of the first location, the second location, and the third location is located on the work route, and the third location is located between the first location and the second location. Therefore, the floor mopping device may rotate in the first direction for the third angle during a time period in which the floor mopping device moves for the third distance, thereby moving for the third distance along an arc line. At this moment, the floor mopping device may be located at the third location on the work route, and its facing direction may form a certain angle with the work route. Next, the floor mopping device may rotate in the second direction for the fourth angle during a time period in which the floor mopping device moves for the fourth distance, thereby moving for the fourth distance along an arc line. At this moment, the floor mopping device may be located at the second location on the work route, and its facing direction may form a certain angle with the work route. Then, the floor mopping device may perform the second rotating step at the second location. In this embodiment, a sum of the first angle and the third angle is equal to a sum of the second angle and the fourth angle.

Figure 8:
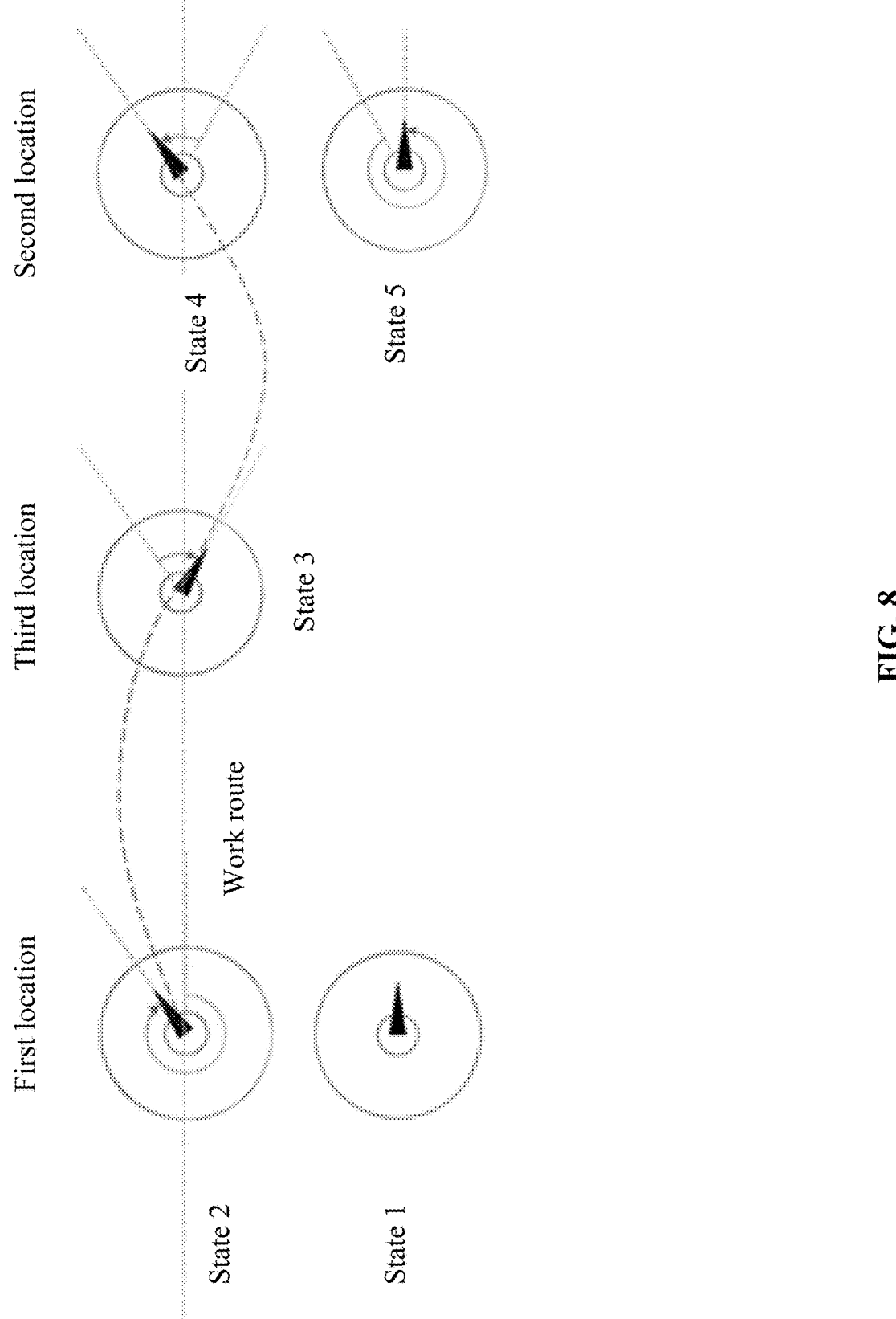
FIG. 8 is a schematic illustration of an operating method for the floor mopping device according to another illustrative embodiment.

FIG. 8 is a schematic illustration of an operating method for the floor mopping device according to another illustrative embodiment. For example, as shown in FIG. 8, the floor mopping device may start at state 1, perform the first rotating step at the first location, i.e., rotating clockwise for the first angle, which is 350 degrees, to state 2. Then, the first moving step in which the floor mopping device moves from the first location to the second location may be implemented as follows. While the floor mopping device moves for the third distance, the floor mopping device may rotate clockwise (the first direction) for 20 degrees (the third angle) to state 3, and move along an arc line to the third location. Next, while the floor mopping device moves for the fourth distance, the floor mopping device may rotate counter clockwise (the second direction) for 25 degrees (the fourth angle) to state 4, and move along an arc line to the second location. As such, the floor mopping device moves from the first location to the second location, i.e., completes the first moving step. It is noted that at this moment, although the floor mopping device is located at the second location, its facing direction may form a certain angle with the work route.

Next, the floor mopping device may perform the second rotating step at the second location, i.e., rotating counter clockwise for the second angle to state 5. Here, a sum of the first angle and the third angle is equal to a sum of the second angle and the fourth angle. Then the second angle is 345 degrees.

As such, during a time period from the start of the first rotating step to the completion of the second rotating step, a total rotating angle of the floor mopping device in the first direction is equal to a total rotating angle in the second direction, and the rotating directions are opposite to each other, and therefore, the deviation errors may be eliminated. At this moment, the floor mopping device may return to the work route, and its facing direction may be the same as the previous facing direction before the first rotating step, such that it is convenient for the floor mopping device to perform the second moving step along the work route.

After the second moving step, the floor mopping device may repeat the first rotating step, the first moving step, the second rotating step, and the second moving step.

In other embodiments based on the sixth embodiment, the moving distance in the second moving step may be zero. In other words, after the floor mopping device completes the second rotating step at the second location, the floor mopping device may perform the first rotating step of the next cycle, and may not carry out an effective second moving step.

In the sixth embodiment, between the first location and the second location, there may be a third location and two arc lines. A person having ordinary skills in the art can appreciate that more middle locations and arc lines may be set between the first location and the second location, as long as during a time period from the start of the first rotating step and the completion of the second rotating step, a total rotating angle of the floor mopping device in the first direction is equal to a total rotating angle in the second direction, and the rotating directions are opposite to each other. The present disclosure does not provide a detailed description of such an embodiment.

In the above sixth embodiment, each of the third distance and the fourth distance may be smaller than or equal to the work width of the autonomous mobile device. For example, the work width may be a width of the mopping plate. In such embodiments, each location on the work route may be covered by the rotations of the floor mopping device, thereby realizing better cleaning effect.

In the above sixth embodiment, the third angle and the fourth angle for which the floor mopping device rotated may be different. In addition, the third distance and the fourth distance and the velocity of the floor mopping device may be different, that is, the arc paths traversed by the floor mopping device while moving for the third distance and the fourth distance may be different. The present disclosure does not provide a specific description. A person having ordinary skills in the art can appreciate, that the specific shape of the arc path does not affect the implementation of the technical solutions of the present disclosure and the corresponding technical effect.

In each of the above embodiments, the floor mopping device may perform additional movements or rotations while performing the first moving step and/or the second moving step, such as actions for reversing directions or avoiding obstacles, thereby completing the work route. The present disclosure does not provide a detailed description of the additional movements or rotations or does not limit the additional movements or rotations.

In some embodiments, the control module 20 may be configured to control the driving module 30, which may cause the floor mopping device 10 to move along the work route to complete the cleaning tasks. Specifically, the control module 20 may control the driving module 30 in a programmed manner such that the floor mopping device 10 may execute the operating methods described in the above various embodiments of the present disclosure to complete the movement along the work route.

In some embodiments, the floor mopping device 10 includes a motion unit configured to provide movement of the floor mopping device 10, one or more processors, and a storage device configured to store computer-executable instructions. The motion unit may include one or more wheels. The control module 20 may include one or more processors. The one or more processors may include, but not be limited to, an application specific integrated circuit (ASIC), a digital signal processor (DSP), a digital signal processing device (DSPD), a programmable logic device (PLD), a field programmable gate array (FPGA), a controller, a microcontroller, a microprocessor, or other electronic components. When the instructions are executed by the one or more processors, the instructions may cause the one or more processors to control the motion unit to perform the methods described in the above various embodiments of the present disclosure.

In some embodiments, the present disclosure also provides a non-transitory computer-readable storage medium or a program product. The computer-readable storage medium or the program product may include instructions, which may be executed by a processor to execute the methods described in the above various embodiments of the present disclosure. The processor may include, but not be limited to, an application specific integrated circuit (ASIC), a digital signal processor (DSP), a digital signal processing device (DSPD), a programmable logic device (PLD), a field programmable gate array (FPGA), a controller, a microcontroller, a microprocessor, or other electronic components. The non-transitory computer-readable medium may include one or more of a hard disk, a flash memory, a read-only memory, a random access memory, an optic disk, a magnetic disk, a magnetic tape, or any other suitable non-transitory storage media.

Regarding the apparatus or devices of the above embodiments, the detailed specific operations performed by various modules or units have been described in detail in the embodiments of the relevant methods, which are not repeated here in detail.

Various embodiments of the present disclosure have been described above. Such descriptions are illustrative, and are not exhaustive, and the present disclosure is not limited to the described embodiments. Without deviating from the scope and spirit of the described various embodiments, a person having ordinary skills in the art can appreciate that many modifications and changes may be obvious. The selections of the terms used herein are for the purpose of explaining the principles of various embodiments, the actual implementations or the improvements to the technologies in the market, or to enable other persons having ordinary skills in the art to understand various disclosed embodiments.

What is claimed is:

1. An operating method for controlling an autonomous mobile device to move along a work route, the operating method comprising:

a first rotating step in which the autonomous mobile device is controlled to rotate in a first direction for a first angle at a first location on the work route;

a first moving step in which the autonomous mobile device is controlled to move to a second location on the work route;

a second rotating step in which the autonomous mobile device is controlled to rotate in a second direction for a second angle at the second location; and a second moving step in which the autonomous mobile device is controlled to continue moving along the work route, wherein the first rotating step, the first moving step, the second rotating step, and the second moving step are configured to form a cycle, and wherein the method includes repeatedly executing the cycle, wherein the first direction and the second direction are opposite to each other, wherein during a time period from a time instance before the first rotating step to a time instance after the second rotating step, a total rotating angle of the autonomous mobile device in the first direction is equal to a total rotating angle of the autonomous mobile device in the second direction, wherein a moving distance in the first moving step is zero, and wherein the second rotating step includes:

controlling the autonomous mobile device to rotate in the second direction for a third angle, and controlling the autonomous mobile device to rotate in the first direction for a fourth angle, wherein the third angle is greater than the fourth angle, and wherein the second angle is equal to a difference between the third angle and the fourth angle.

2. The operating method of claim 1, wherein the work route includes at least one of the following route forming units: a straight line moving route, a curved line moving route, or a turning route followed in response to a sensor detecting an obstacle.

3. The operating method of claim 1, wherein during the first moving step, the autonomous mobile device is controlled to move along a straight line for a first distance, and during the second moving step, the autonomous mobile device is controlled to move along a straight line for a second distance.

4. The operating method of claim 3, wherein each of the first angle and the second angle is a positive integer number times of 360 degrees.

5. The operating method of claim 3, wherein each of the first angle and the second angle is an odd number times of 180 degrees.

6. The operating method of claim 3, wherein each of the first distance and the second distance is smaller than or equal to a work width of the autonomous mobile device.

7. The operating method of claim 1, wherein the first moving step also comprises:

a third moving step in which the autonomous mobile device is controlled to move along a straight line for a third distance to a third location;

a third rotating step in which the autonomous mobile device is controlled to rotate in the first direction for the third angle at the third location;

a fourth moving step in which the autonomous mobile device is controlled to move along a straight line for a fourth distance to a fourth location, wherein, the third location and the fourth location are located at two sides of the work route, and projections of the third location and the fourth location on the work route are located between the first location and the second location, a fourth rotating step in which the autonomous mobile device is controlled to rotate in the second direction for the fourth angle at the fourth location; and a fifth moving step in which the autonomous mobile device is controlled to move along a straight line for a fifth distance to the second location, wherein a sum of the first angle and the third angle is equal to a sum of the second angle and the fourth angle.

8. The operating method of claim 7, wherein a moving distance of the autonomous mobile device in the second moving step is zero.

9. The operating method of claim 7, wherein each of the third distance, the fourth distance, and the fifth distance is smaller than or equal to a work width of the autonomous mobile device.

10. The operating method of claim 1, wherein the first moving step also comprises:

a third moving step in which the autonomous mobile device is controlled to move for a third distance to a third location; and a fourth moving step in which the autonomous mobile device is controlled to move for a fourth distance to the second location, wherein, each of the first location, the second location, and the third location is located on the work route, and the third location is located between the first location and the second location, wherein the autonomous mobile device is controlled to rotate in the first direction for the third angle during a time period in which the autonomous mobile device moves for the third distance, such that the autonomous mobile device moves along an arc line for the third distance, wherein the autonomous mobile device is controlled to rotate in the second direction for the fourth angle during a time period in which the autonomous mobile device moves for the fourth distance, such that the autonomous mobile device moves along an arc line for the fourth distance, and wherein a sum of the first angle and the third angle is equal to a sum of the second angle and the fourth angle.

11. The operating method of claim 10, wherein a moving distance of the autonomous mobile device in the second moving step is zero.

12. The operating method of claim 10, wherein each of the third distance and the fourth distance is smaller than or equal to a work width of the autonomous mobile device.

13. An autonomous mobile device, comprising:

a driving module configured to move the autonomous mobile device; and a control module configured to control the driving module to move the autonomous mobile device along a work route, wherein, when the control module is configured to drive the driving module to move the autonomous mobile device along the work route, the control module is configured to perform:

a first rotating step in which the control module controls the autonomous mobile device to rotate in a first direction for a first angle at a first location on the work route;

a first moving step in which the control module controls the autonomous mobile device to move to a second location on the work route;

a second rotating step in which the control module controls the autonomous mobile device to rotate in a second direction for a second angle at the second location; and a second moving step in which the control module controls the autonomous mobile device to continue moving along the work route, wherein, the first rotating step, the first moving step, the second rotating step, the second moving step are configured to form a cycle, and the control module is configured to control the driving module to repeatedly execute the cycle, wherein the first direction and the second direction are opposite to each other, wherein during a time period from a time instance before the first rotating step to a time instance after the second rotating step, a total rotating angle of the autonomous mobile device in the first direction is equal to a total rotating angle of the autonomous mobile device in the second direction, wherein a moving distance in the first moving step is zero, and wherein the second rotating step includes:

controlling the autonomous mobile device to rotate in the second direction for a third angle, and controlling the autonomous mobile device to rotate in the first direction for a fourth angle, wherein the third angle is greater than the fourth angle, and wherein the second angle is equal to a difference between the third angle and the fourth angle.

14. A non-transitory computer-readable storage medium storing instructions, wherein when the instructions are executed by a processor of an autonomous mobile device, the instructions cause the processor of the autonomous mobile device to execute an operating method comprising:

a first rotating step in which the autonomous mobile device is controlled to rotate in a first direction for a first angle at a first location on a work route;

a first moving step in which the autonomous mobile device is controlled to move to a second location on the work route;

a second rotating step in which the autonomous mobile device is controlled to rotate in a second direction for a second angle at the second location; and a second moving step in which the autonomous mobile device is controlled to continue moving along the work route, wherein the first rotating step, the first moving step, the second rotating step, and the second moving step are configured to form a cycle, and wherein the operating method includes repeatedly executing the cycle, wherein the first direction and the second direction are opposite to each other, wherein during a time period from a time instance before the first rotating step to a time instance after the second rotating step, a total rotating angle of the autonomous mobile device in the first direction is equal to a total rotating angle of the autonomous mobile device in the second direction, and wherein the first moving step also includes:

a third moving step in which the autonomous mobile device is controlled to move along a straight line for a third distance to a third location;

a third rotating step in which the autonomous mobile device is controlled to rotate in the first direction for a third angle at the third location;

a fourth moving step in which the autonomous mobile device is controlled to move along a straight line for a fourth distance to a fourth location, wherein, the third location and the fourth location are located at two sides of the work route, and projections of the third location and the fourth location on the work route are located between the first location and the second location;

a fourth rotating step in which the autonomous mobile device is controlled to rotate in the second direction for a fourth angle at the fourth location; and a fifth moving step in which the autonomous mobile device is controlled to move along a straight line for a fifth distance to the second location, wherein a sum of the first angle and the third angle is equal to a sum of the second angle and the fourth angle.

15. The non-transitory computer-readable storage medium of claim 14, wherein the work route includes at least one of the following route forming units: a straight line moving route, a curved line moving route, or a turning route followed in response to a sensor detecting an obstacle.

16. The non-transitory computer-readable storage medium of claim 14, wherein during the first moving step, the autonomous mobile device is controlled to move along a straight line for a first distance, and during the second moving step, the autonomous mobile device is controlled to move along a straight line for a second distance.

* * * * *